(12) United States Patent
Demers et al.

(10) Patent No.: US 7,044,452 B2
(45) Date of Patent: May 16, 2006

(54) HYDRAULIC TURBINE DRAFT TUBE DEFLECTOR WITH ENHANCED DISSOLVED OXYGEN

(75) Inventors: Eric Demers, Sherbrooke (CA); Normand Desy, Laval (CA)

(73) Assignee: General Electric Canada, Mississauga ( * ) Notice: Subject to any disclaimer, the term of this patent is extended or adjusted under 35 U.S.C. 154(b) by 36 days.

(21) Appl. No.: 10/834,906

(22) Filed: Apr. 30, 2004

(65) Prior Publication Data

US 2005/0242451 A1 Nov. 3, 2005

(51) Int. Cl.
*B01F 3/04* (2006.01)

(52) U.S. Cl. .................. 261/37; 261/93; 261/DIG. 75; 415/116

(58) Field of Classification Search .............. 261/34.1, 261/37, 84, 91, 93, DIG. 75; 415/116
See application file for complete search history.

(56) References Cited

U.S. PATENT DOCUMENTS

| | | | | |
|---|---|---|---|---|
| 2,685,429 | A | * | 8/1954 | Auyer ........................ 415/110 |
| 3,572,658 | A | * | 3/1971 | Ravitts ....................... 261/36.1 |
| 3,671,022 | A | * | 6/1972 | Laird et al. .................... 261/29 |
| 3,724,966 | A | | 4/1973 | Sproule |
| 4,051,204 | A | * | 9/1977 | Muller et al. ............... 261/36.1 |
| 4,142,825 | A | | 3/1979 | Koeller |
| 4,142,826 | A | | 3/1979 | Koeller |
| 4,146,351 | A | | 3/1979 | Koeller |
| 4,431,597 | A | * | 2/1984 | Cramer et al. ................. 261/93 |
| 4,512,936 | A | * | 4/1985 | Oshima et al. ................ 261/93 |
| 4,514,343 | A | * | 4/1985 | Cramer et al. ................ 261/37 |
| 4,515,524 | A | * | 5/1985 | Fisher, Jr. ................. 415/169.1 |
| 4,780,051 | A | | 10/1988 | Fisher, Jr. |
| 5,407,319 | A | * | 4/1995 | Harrogate et al. .......... 415/115 |
| 5,417,545 | A | * | 5/1995 | Harrogate ................... 415/115 |
| 5,823,740 | A | | 10/1998 | Cybularz et al. |
| 5,879,130 | A | | 3/1999 | Beyer et al. |
| 5,896,657 | A | | 4/1999 | Beyer et al. |
| 5,924,842 | A | | 7/1999 | Beyer et al. |
| 5,924,844 | A | | 7/1999 | Cybularz et al. |
| 5,941,682 | A | | 8/1999 | Cybularz et al. |
| 6,095,749 | A | | 8/2000 | Beyer et al. |
| 6,155,783 | A | | 12/2000 | Beyer |

(Continued)

FOREIGN PATENT DOCUMENTS

FR 2809139 11/2001

(Continued)

OTHER PUBLICATIONS

U.S. Appl. No. 10/602,601, filed Jan. 7, 2004, Desy et al.

*Primary Examiner*—Scott Bushey

(57) ABSTRACT

A deflector for use in a hydraulic turbine is adapted to be mounted relative to a vertically extending wall of the draft tube. The deflector has an upstream plate and a downstream plate. The upstream plate is positioned to extend downwardly and outwardly from the wall of the draft tube and the downstream plate is positioned to extend downwardly and inwardly from the upstream plate. The downstream plate has at least one elongated air communication port extending therethrough and adjacent the upstream plate. An air supply inlet portion extends from the wall of the draft tube into the deflector above the elongated air communication port permitting an oxygen containing gas to flow from the air supply inlet portion downwardly through the deflector, out the elongated air communication port and into the water flowing past the downstream plate so as to enhance the dissolved oxygen content of the water.

26 Claims, 4 Drawing Sheets

U.S. PATENT DOCUMENTS

| | | |
|---|---|---|
| 6,247,893 B1 | 6/2001 | Beyer et al. |
| 6,394,423 B1 * | 5/2002 | Vento .......................... 261/29 |
| 6,454,533 B1 | 9/2002 | Beyer |
| 6,854,958 B1 * | 2/2005 | Desy .......................... 415/116 |
| 6,971,843 B1 * | 12/2005 | Desy et al. ................. 415/116 |

FOREIGN PATENT DOCUMENTS

| | | | |
|---|---|---|---|
| JP | 11-153081 | * | 6/1999 |
| JP | 2003-184726 | * | 7/2003 |
| SU | 1263902 A1 | | 10/1986 |

* cited by examiner

HYDRAULIC TURBINE DRAFT TUBE DEFLECTOR WITH ENHANCED DISSOLVED OXYGEN

FIELD OF THE INVENTION

The present invention relates to a hydraulic turbine and, in particular, to one or more deflectors mounted in a draft tube of the turbine adapted to increase the dissolved oxygen content of water discharged from the turbine.

BACKGROUND OF THE INVENTION

The oxygen levels of water discharged from hydraulic turbines used in hydroelectric installations have been known to provide an environmental problem due to the discharged water having relatively low levels of dissolved oxygen. The problem is more predominant in the summer months. During the summer months, thermal stratification of water in an upstream water reservoir creates warmer water near the surface having relatively high dissolved oxygen and colder water near the bottom of the reservoir having relatively lower dissolved oxygen. Because the water utilized by the turbines is usually taken from the bottom of the reservoir, this water presents a potentially environmental hazard when discharged downstream by the turbines.

In the building of new hydroelectric installations and the refurbishing of existing hydroelectric installations, there is an opportunity to improve the level of dissolved oxygen in the water by introducing oxygen to the water as it passes through the turbine. It is known to admit air through one or more runner blades in the turbine as disclosed in U.S. Pat. No. 5,879,130 issued Mar. 9, 1999; U.S. Pat. No. 5,896,657 issued Apr. 27, 1999; U.S. Pat. No. 5,924,842 issued Jul. 20, 1999; U.S. Pat. No. 6,155,783 issued Dec. 5, 2000; U.S. Pat. No. 6,247,893 issued Jun. 19, 2001, and U.S. Pat. No. 6,454,533 issued Sep. 24, 2002. However, each of these turbines requires introducing air through at least one of the moveable turbine runner blades. This requires complex blade manufacture and the introduction of air through a moving part.

It is also known from U.S. Pat. No. 5,941,682 issued Aug. 24, 1999 to enhance oxygen content in water passed through a turbine by having a gas chamber substantially surrounding an upper peripheral portion of the draft tube and by having a continuous gas discharge slot that extends about an entire circumference of the water passage. Gas is discharged from the slot under pressure into the water passage so that the level of dissolved oxygen in the water discharged from the turbine is increased. To utilise this arrangement in existing turbine installations, however, involves costly removal of an upper portion of the draft tube along with a 360° surrounding portion of the concrete from the foundation.

It is also known from U.S. Pat. No. 4,142,825 issued Mar. 6, 1979; U.S. Pat. No. 4,142,826 issued Mar. 6, 1979; and U.S. Pat. No. 4,146,351 issued Mar. 27, 1979, to admit air through the foundation of the draft tube. The purpose of this air admission however, is to quiet pressure pulsations and cavitation problems caused by high or part load rope vortices within the draft tube. A finite number of shroud covered air outlets extend through the draft tube to provide limited air admission. These patents, however are not concerned with increasing dissolved oxygen in the water passing through the turbine which requires a greater amount of air admission into the working fluid. U.S. Pat. No. 4,142,825 discloses an air eductor having a flow control plate overlying an air box. The air box has front upstream and downstream plates providing a convergent-divergent flow path with the cover plate. A series of small air holes are located spaced along the downstream plate at the throat adjacent the juncture of the convergent-divergent plates for introducing a limited amount of air into the working fluid for the purpose of stabilizing turbine operation by making this operation smoother, quieter and more reliable during part load conditions. Admission of the air through the air holes is accomplished by a venturi or suction like effect as fluid passes over the convergent-divergent plates. The amount of air introduced into the working fluid is limited, because once the amount of air starts to rise, it can adversely effect the flow of the working fluid and result in decreased efficiency of operation.

Accordingly, there is a need for an improved deflector that introduces sufficient amounts of oxygen into the water passing through the turbine for the purpose of increasing the dissolved oxygen content in water discharged from the turbine.

SUMMARY OF THE INVENTION

The present invention relates to deflectors for use in a hydraulic turbine that are configured to introduce air in sufficient quantities through the deflectors and into the water so as to enhance the dissolved oxygen content in the water passing through the turbine.

The deflector is adapted to be mounted relative to a vertically extending wall of the draft tube of the turbine. The deflector has an upstream plate and a downstream plate. The upstream plate is positioned to extend downwardly and outwardly from the wall of the draft tube and the downstream plate is positioned to extend downwardly and inwardly from the upstream plate. The downstream plate has at least one elongated air communication port extending therethrough and adjacent the upstream plate. An air supply inlet portion extends adjacent, through, or from the wall of the draft tube into the deflector above the elongated air communication port permitting an oxygen containing gas to flow from the air supply inlet portion downwardly through the deflector, out the elongated air communication port and into the water flowing past the downstream plate so as to enhance the dissolved oxygen content of the water.

It should be understood that as the water passes the deflector, the orientation of the upstream and downstream plates provides a relatively sharp change in water flow direction that results in a venturi like effect that draws the oxygen containing gas out through the elongated air communication port. As the oxygen containing gas is drawn out into the water flow through the air elongated communication port, portions of the water flowing in the draft tube randomly punch through the oxygen containing gas and into the deflector through the elongated air communication port. While this phenominom results in good mixing of the oxygen with the water flowing past the deflector, the water passing into the deflector could present a problem by filling up the air supply inlet portion. However the present invention prevents water from filling up the deflector and covering the air supply inlet portion by positioning the air supply inlet portion above the elongated air communication port so that, with the assistance of gravity, water follows the path of least resistance and randomly flows out the deflector, just as it randomly flows in, through the elongated air communication port. It should be understood that by air supply inlet portion, it is meant that portion of the air supply flow in the deflector that is positioned above the elongated air communication port. For example, it is envisaged that the air inlet into the deflector may be below the air communication port, however, a baffle may be utilized to extend from the air supply inlet upwardly to provide an air supply inlet portion that is above the air communication port. Alternatively, the air supply inlet could be located above the air communication port and thereby have an air supply inlet portion positioned above the elongated air communication port.

To further enhance the venturi effect of the deflector, the upstream plate may have a back surface portion and a first elongated lip portion that extends transversely across the upstream plate. Further the downstream plate is arranged to extend from the back surface portion of the upstream plate with the first elongated lip overhanging the downstream plate. The elongated air communication port may comprise an elongated slot defining a second elongated lip on the downstream plate which slot extends between the first and second elongated lips.

In higher pressure draft tube embodiments, each of the deflectors further includes a cover plate mounted within the draft tube in spaced relation with the upstream and downstream plates to provide a water flow control channel therebetween.

In one embodiment each of the deflectors further comprises a baffle portion extending inwardly relative from the inner wall of the draft tube below the air supply inlet portion and above the elongated air communication port. The baffle portion in effect defines a water circulation chamber positioned below the baffle portion and behind the downstream plate. The baffle portion acts to deflect water passing through the elongated air communication port into and out from the water circulation chamber. The baffle portion also maintain the air supply inlet portion above the air communication port.

In accordance with the present invention there is provided a deflector for use in a hydraulic turbine for increasing the oxygen content of water flowing through the hydraulic turbine where the draft tube has a vertically extending inside wall. The deflector is adapted to be mounted relative to the vertically extending inside wall of the draft tube. The deflector comprises an upstream plate and a downstream plate. The upstream plate is positioned to extend downwardly and outwardly relative from the vertically extending inside wall of the draft tube. The downstream plate is positioned to extend downwardly and inwardly from the upstream plate. The deflector has at least one elongated air communication port extending through the downstream plate and adjacent the upstream plate. The deflector has an air supply inlet portion positioned above the elongated air communication port and adjacent the inner wall of the draft tube. The air supply inlet portion permits an oxygen containing gas to enter the deflector and to flow downwardly through the deflector out the elongated air communication port and into the water flowing past the downstream plate.

In accordance with the present invention, there is provided a hydraulic turbine adapted for increasing the oxygen content of water flowing through the turbine. The turbine comprises a plurality of the deflectors mounted to a vertically extending wall of a draft tube of the turbine.

BRIEF DESCRIPTION OF THE DRAWINGS

For a better understanding of the nature and objects of the present invention reference may be had to the accompanying diagrammatic drawings in which.

DETAILED DESCRIPTION OF THE INVENTION

The present invention relates to a hydraulic turbine and, in particular, to a plurality of deflectors mounted within a draft tube of the turbine adapted to increase the dissolved oxygen content of water discharged from the turbine.

Figure 1:
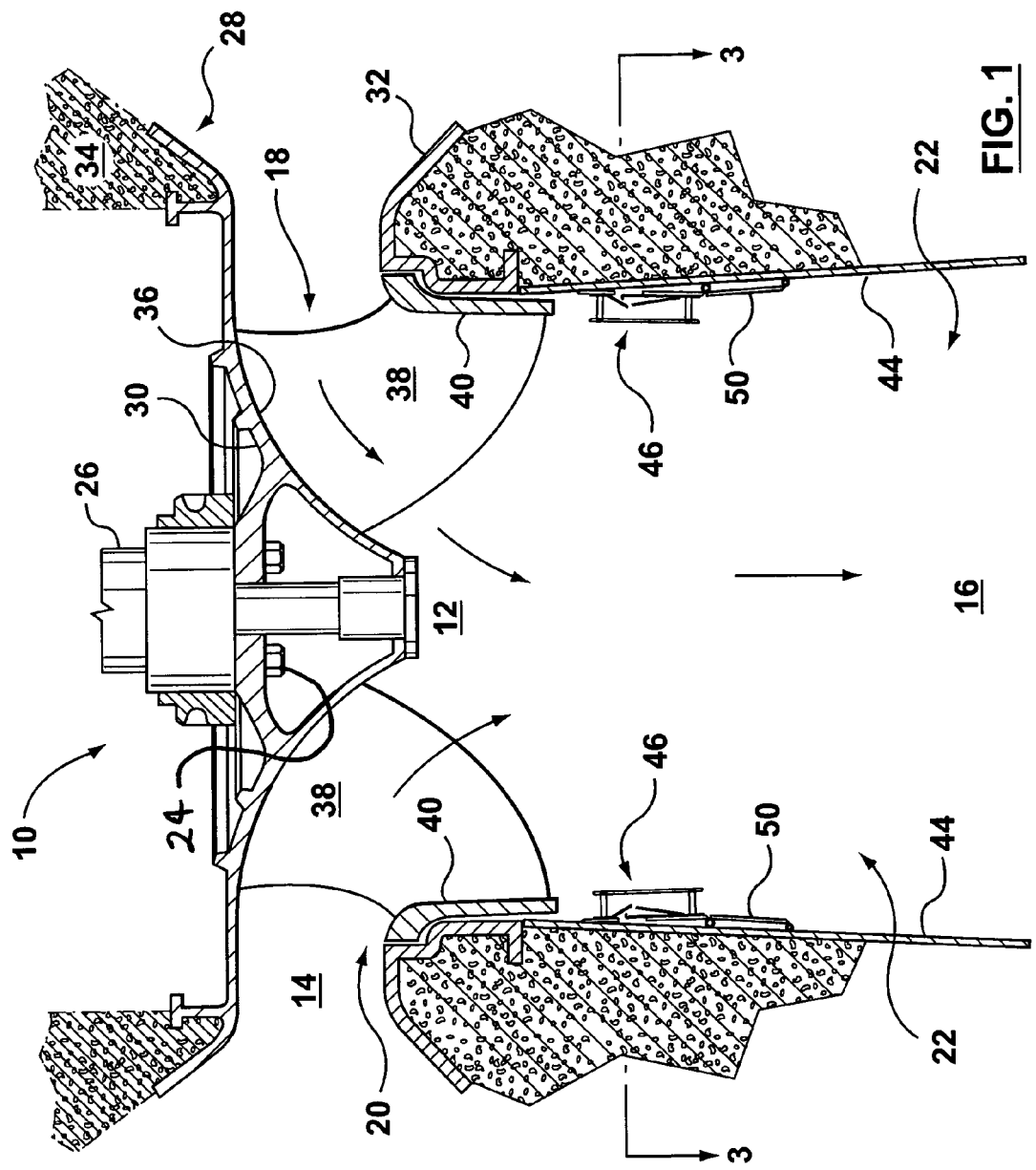
FIG. 1 is an elevational view, partially in cross-section, of a Francis turbine showing deflectors mounted relative to the draft tube inside wall.

Referring to FIG. 1, a portion of one embodiment of a hydraulic turbine installation 10 is illustrated for use in the generation of hydroelectricity. The installation 10 has a water passageway 12. Water flows from an inlet 14 of passageway 12 to an outlet 16 located at a lower elevation. The water passageway 12 passes through a Francis turbine 18 having a runner 20 and a draft tube. 22. The runner 20 is secured by bolts 24 to a shaft 26 transmitting energy to a generator (not shown). The turbine 18 is mounted in a stationary casing 28 having a head cover 30 and a bottom discharge ring 32. The head cover 30, discharge ring 32 and draft tube 22 are embedded in concrete foundation 34.

Runner 20 is rotabily mounted in casing 28, has a crown 36 and a plurality of circumferentially spaced runner blades 38 extending therefrom to an enclosing band 40.

It should be understood that installation 10 includes other components such, as, for example, stay vanes and wicket gates which are not shown.

Figure 2:
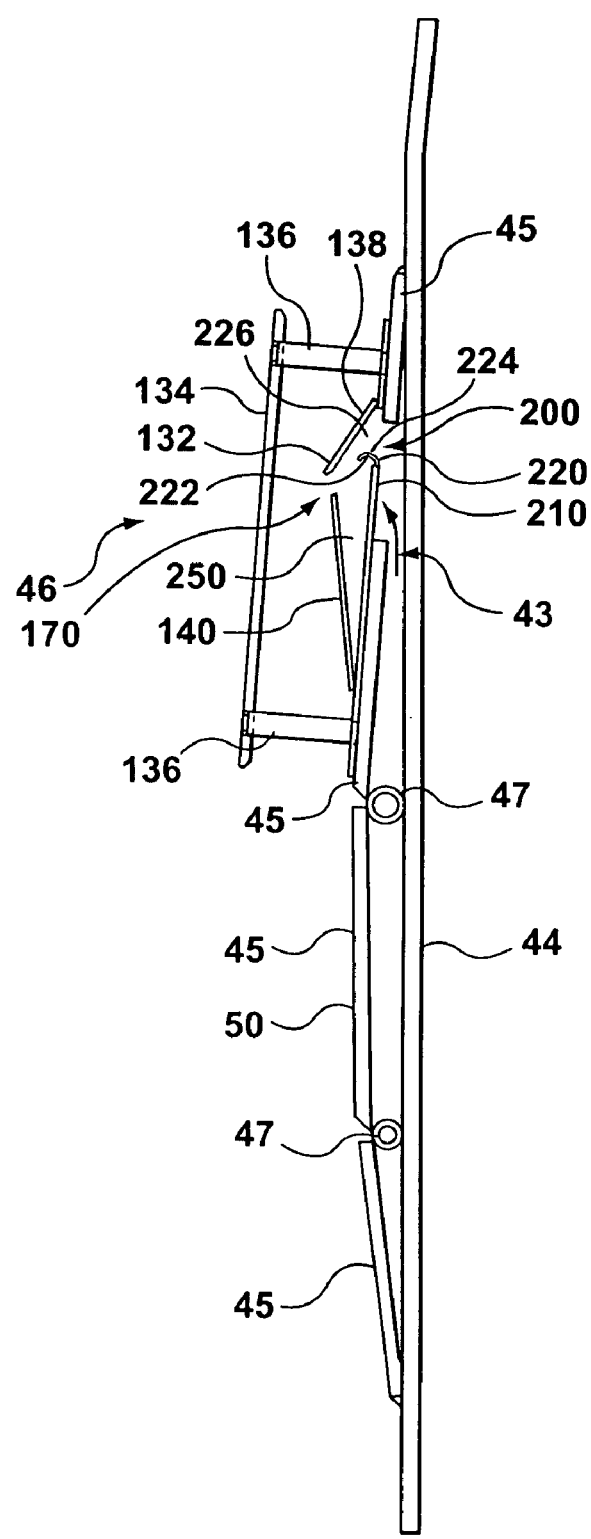
FIG. 2 is an elevational sectional view of the deflector according to the present invention.
Figure 3:
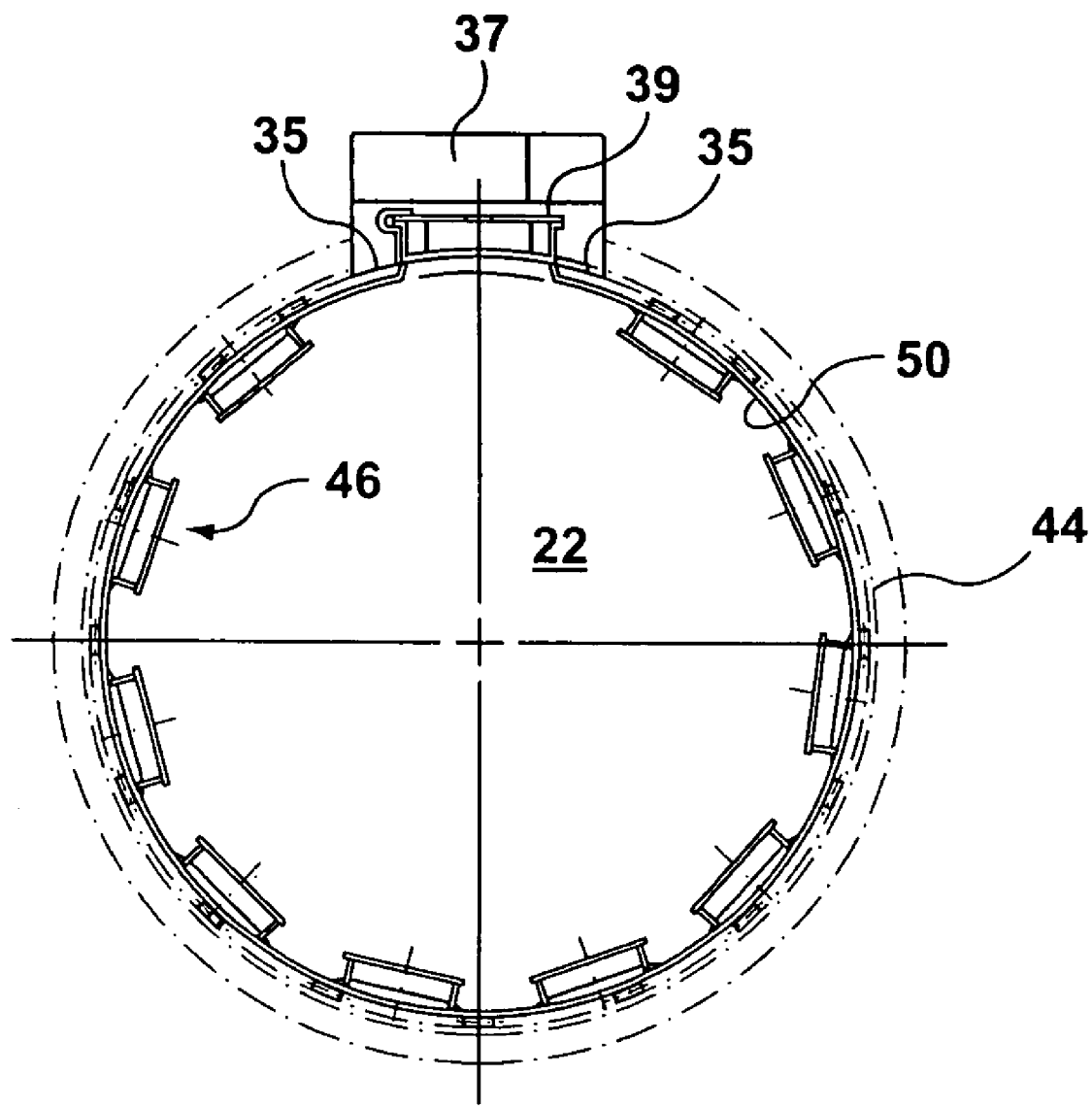
FIG. 3 is a section view taken at 3—3 of FIG. 1.

The draft tube 22 has a vertically extending inside wall 44. Referring to FIGS. 1, 2, and 3, a gas distribution manifold 50 is mounted to and extends at least substantially around a portion of the vertically extending inside wall 44 of the draft tube 22. The manifold 50 is mounted to inside wall 44 by welding of the manifold to the wall 44 whereby wall 44 and wall portions 45 of manifold 50 define the inside space or chamber of manifold 50. The wall portions 45 of the manifold are interconnected by spacers 47. Spacers 47 maintain the manifold wall portions 45 at spaced distance from the vertically extending inside wall 44 of the draft tube 22. As best shown in FIG. 2, an air exit manifold opening 43 is located at the upper most manifold wall portion 45.

Referring to FIG. 3, it can be seen that the manifold extends substantially around the draft tube 22 except for the position of the man hole cover 39. The man hole cover 39 permits access into the draft tube for repairs. The man hole cover is typically included at the end of a passageway or a corridor 37 located in the concrete foundation 34. Air may be supplied through the draft tube inside wall 44 at locations 35. This air then circulates in an annular fashion about the manifold 50 to escape out through the air exit manifold opening. It should be understood that the entrance 35 of air flow into the manifold 50 can be controlled by valves such that the air may be introduced into the manifold 50 during those months when the oxygen content of the water flowing through the draft tube 22 needs to be enhanced.

Referring to FIGS. 1, 2 and 3, a plurality of deflectors are shown for introducing oxygen containing gas into the water flowing through the draft tube. It should be understood that the oxygen containing gas preferably is air provided at ambient pressure. Further, the plurality of the deflectors 46 are located in the draft tube closely adjacent to the blades 38 of the turbine. The closeness of these deflectors 46 to the turbine blades 38 permits for oxygen to be introduced at a relative lower water pressure as compared with the water pressure experienced further down the draft tube 22. Also, it is more beneficial to locate the deflector 46 adjacent the turbine blades 38 to enhance the mixing oxygen into the water flow.

Figure 4:
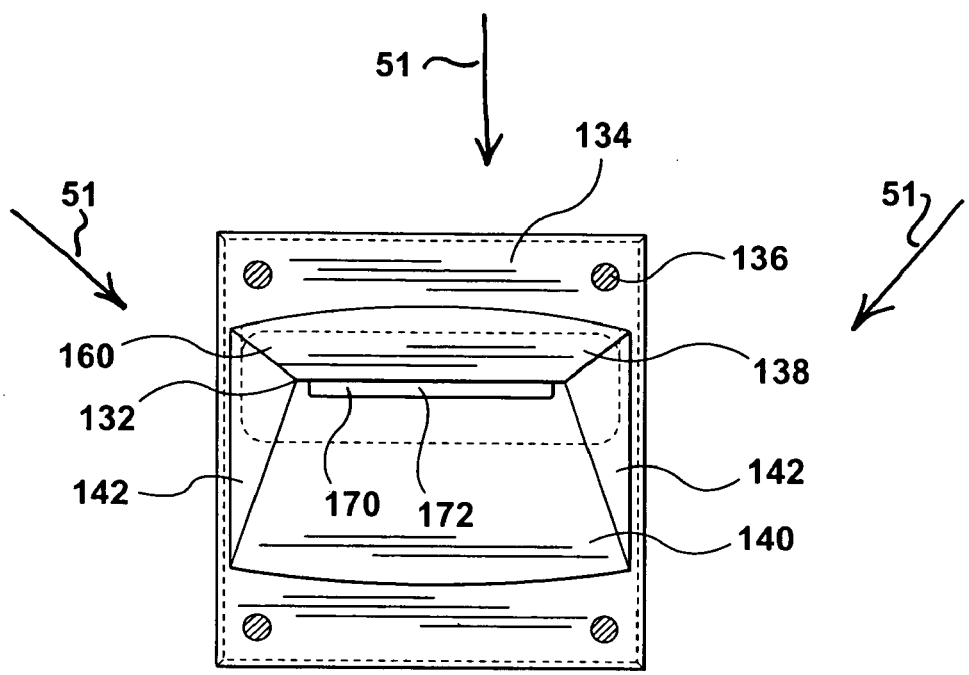
FIG. 4 is an elevation view of the deflector.
Figure 5:
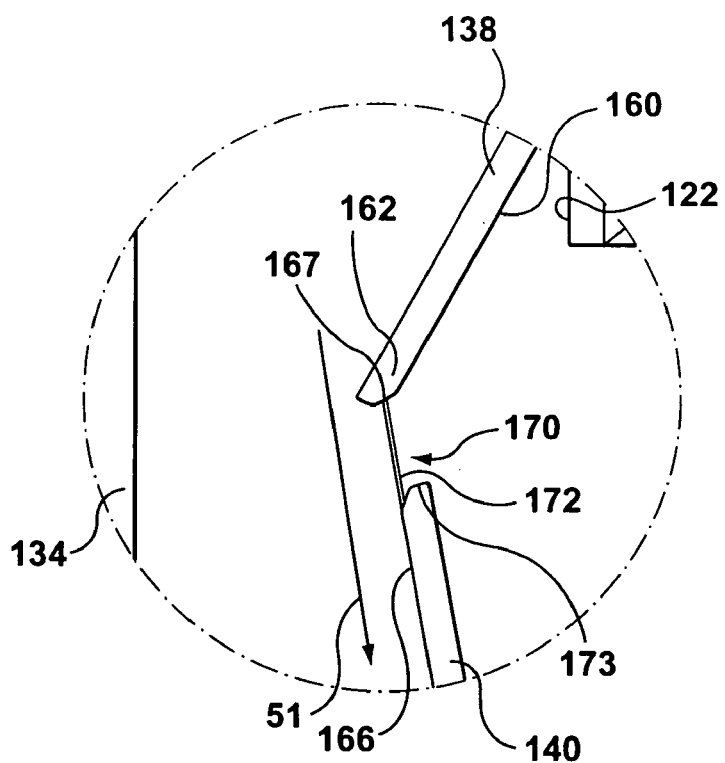
FIG. 5 is an enlarged side view of the elongated air communication port of the deflector.

Referring to FIGS. 2, 4 and 5, each of the deflectors 46 has a flow control cover plate 134 overlying upstream and downstream plates 138, 140, respectively. The upstream plate 138 extends downwardly and outwardly relative from the vertically extending inside wall 44. In particular an upper end portion of upstream plate 138 is welded to an upper manifold wall portion 45. The downstream plate 140 is welded at an upper end portion to the upstream plate 138. The downstream plate 140 extends downwardly and inwardly from the upstream plate 138. A lower edge portion of the down stream plate is welded to one of the manifold wall portions 45. The cover plate 134 is secured by spacers 136 welded to manifold wall portions 45 so as to provide a flow path for water through the deflector 46 of convergent-divergent cross-section, as seen in FIG. 2, and having a throat at the juncture 132 of plates 138, 140. The upstream plate 138, downstream plate 140 and side plates 142 are welded together and to one of the manifold wall portions 45. In this manner the deflector 46 is mounted relative from the inside wall 44 of the draft tube 22 via the wall portions 45 of the manifold 50. It should be understood that in other embodiments the whole or a part of the deflector 46 could be mounted either directly to the inner wall 44 of the draft tube 22 or some combination of the inner wall 44 and the manifold 50.

The upstream plate 138 is referred to as upstream because it is upstream relative to plate 140 in the direction of water flowing through the draft tube 22 as shown by arrows 51 in FIGS. 1, 5 and 6. Further, the downstream plate 140 is referred to as downstream because it is positioned downstream of plate 138 in the direction 51 of water flowing through the draft tube 22. The upstream and downstream plates 138, 140 together with side plates 142 form an enclosure that overlays the air exit manifold opening 43 of the manifold 50. It should be understood that in an alternative embodiment, the air exit manifold opening 43 could simply be an air passageway extending through the inner wall 44 of draft tube 22. In this alternative embodiment, no manifold 50 would be employed.

As best seen in FIGS. 4 and 5, the upstream plate 138 is spaced from the cover plate 134 in converging relation therewith relative to the direction of water flow 51 through the deflector 46. The downstream plate 140 is spaced from the cover plate 134 in diverging relation therewith relative to the direction of water flow 51 through the deflector 46. This converging-diverging relationship creates a venturi or suction like effect immediately downstream of the juncture 132 between plates 138, 140. The cover plate 134 extends over the upstream and downstream plates 138, 140 and may, if desired, extend over a surface area beyond that of the upstream and downstream plates 138, 140. It should be understood that in some low pressure applications, it is envisaged that the cover plate 134 may not be required and the abrupt corner at the juncture 132 between the upstream and downstream plates 138,140 is sufficient in itself to create a negative pressure zone immediately downstream of the juncture 132.

The upstream plate 138 has a back surface portion 160 and a first elongated lip portion 162 that extends laterally across the deflector 46. The downstream plate 140 extends from the back surface portion 160 of the upstream plate with the first elongated lip 162 overhanging the downstream plate 140. An elongated air communication port 170 is located in the downstream plate 140 that extends adjacent the upstream plate 138. The downstream plate 140 has a flat outer surface portion 166 and the air communication port 170 has a second elongated lip 172 that extends laterally across the downstream plate so as to define the elongated air communication port 170 between the first and second elongated lips 162, 172. As best seen in FIG. 5 the first elongated lip 166 is rounded on a first end surface portion 167 facing into the elongated air communication port 170 and the second elongated lip 172 is rounded on a second end surface portion 173 facing out of the elongated air communication port 170 to thereby define angulation for the elongated air communication port 170 that is beneficial to the introduction of oxygen containing gas into water flowing past port 170.

As water flows through the deflector 46 as shown by arrows 51 in FIG. 4, ambient air is induced to flow out through the elongated air communication port 170. It should be understood that the water may flow through the deflector 46 in transverse flow components as shown in FIG. 4. by passing left to right or right to left through open sides between the cover plate 134 and the plates 138 and 140.

Referring to FIG. 2, each of the deflectors 46 has an air supply inlet portion 200 that is positioned vertically above the elongated air communication port 170. The air supply inlet portion is positioned at the draft tube 22 in air flow communication with air exit manifold opening 43. The air supply inlet portion permits oxygen containing gas and preferably ambient air to enter the deflector 46 and to flow downwardly through the deflector 46 out the elongated air communication port 170 and into the water flowing past the downstream plate 140. In the embodiment shown in FIG. 2, the air exit manifold opening 43 is shown to be positioned vertically below the air communication port 170. To ensure that the air supply inlet portion 200 is located vertically above the air communication port 170, the deflector 46 further includes baffle 210. Baffle 210 comprises the bottom wall for the deflector 46 which is welded to the end portion of the downstream plate 140. The baffle 210 extends upwardly relative to the wall portion 45 of the manifold 50 and extends to an inwardly turned baffle portion 220. Baffle portion 220 extends inwardly relative from the inner wall 44 of the draft tube 22 below the air supply inlet portion 200 and above the elongated air communication port 170. The baffle portion 220 in cross-section has an inside concave like wall 222 and an outside convex like wall 224. The curvature of the baffle portion 220 is believed to assist the circulation of air around the convex like wall 224 between this air supply inlet portion 200 and the upstream plate 138 and downwardly out the air communication port 170. In effect, an internal air flow passageway 226 is formed between the upstream plate 138 and the baffle portion 220. The baffle portion 220 together with baffle 210 and the downstream plate 140 form a water circulation chamber 250. Water circulation chamber 250 is positioned below the baffle portion 220 and behind the downstream plate 140. The concave curved wall 222 of the baffle portion 220 assists in the deflection of water passing through the elongated air communication port 170 into and out from the water circulation chamber 250.

As shown in FIG. 2, the air exit manifold opening 43 is positioned below the vertical upwardly extension of the baffle 210 and the baffle portion 220. It should be understood that in other embodiments, the shape of the baffle portion 220 may be a straight shape that extends upwardly and outwardly at an angle of about 45 degrees, for example. The circulation of water within water chamber 250 is assisted by baffle portion 220. The vertical extension of baffle 210 effectively raises the position of the air supply inlet portion to be above the air communication port 170. The vertical extension provided by baffle 220 is not necessary in instances where the manifold has an air exit opening positioned above the air communication port 170. In any event, the air supply inlet portion 200 is to be positioned above the air communication port in order to benefit from the effects of gravity.

It should be understood that while the quantity of oxygen admitted into the water flow stream may introduce flow disturbances and inefficiencies in turbine operation, the additional oxygen need only be admitted into the water flow during the summer months or the time of year when thermal stratification of water in an upstream water reservoir creates warmer water near the surface having relatively high dissolved oxygen and a colder water near the bottom of the reservoir having relatively lower dissolved oxygen.

It should be understood that while the turbine installation is shown for a Francis type turbine in FIG. 1, the deflector is operable to enhance the flow of oxygen containing gas into the draft tube for other turbine blade configurations.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A hydraulic turbine adapted for increasing the oxygen content of water flowing through the turbine, the turbine comprising:

a draft tube having a vertically extending inside wall;

a plurality of deflectors each mounted relative to the vertically extending inside wall of the draft tube, each of the deflectors comprising an upstream plate and a downstream plate, the upstream plate being positioned to extend downwardly and outwardly relative from the vertically extending inside wall of the draft tube and the downstream plate being positioned to extend downwardly and inwardly from the upstream plate, each of the deflectors comprising at least one elongated air communication port extending through the downstream plate and adjacent the upstream plate, each of the deflectors having an air supply inlet portion positioned above the elongated air communication port at the inner wall of the draft tube, and the air supply inlet portion permitting an oxygen containing gas to enter the deflector and to flow downwardly through the deflector out the elongated air communication port and into the water flowing past the downstream plate.

2. The hydraulic turbine of claim 1 wherein the upstream plate has a back surface portion and a first elongated lip portion that extends transversely across the upstream plate, and the downstream plate extends from the back surface portion of the upstream plate with the first elongated lip overhanging the downstream plate, and the at least one elongated air communication port has a second elongated lip on the downstream plate.

3. The hydraulic turbine of claim 2 wherein the first elongated lip is rounded on a first end surface portion thereof facing into the elongated air communication port and the second elongated lip is rounded on a second end surface portion thereof facing out of the elongated air communication port.

4. The hydraulic turbine of claim 1 wherein each of the deflectors further includes a cover plate mounted within the draft tube in spaced relation with the upstream and downstream plates to provide a water flow channel therebetween.

5. The hydraulic turbine of claim 1 wherein the oxygen containing gas is ambient air.

6. The hydraulic turbine of claim 1 further including a turbine runner mounted above the draft tube and each of the deflectors being mounted relative to the vertically inner wall of the draft tube closely adjacent the turbine runner.

7. The hydraulic turbine of claim 1 wherein each of the deflectors further comprises a baffle portion extending inwardly relative from the inner wall of the draft tube below the air supply inlet portion and above the elongated air communication port, and a water circulation chamber positioned below the baffle portion and behind the downstream plate wherein the baffle portion deflects water passing through the elongated air communication port into and out from the water circulation chamber.

8. The hydraulic turbine of claim 7 wherein each of the deflectors has an internal air flow passageway extending from the air supply inlet portion to the elongated air communication port between the upstream plate and the baffle portion.

9. The hydraulic turbine of claim 8 wherein the baffle portion is curved in cross-section with an inside concave like wall facing into the water circulation chamber and an outside convex like wall facing the internal air flow passageway.

10. The hydraulic turbine of claim 1 further including a manifold mounted to the inside wall of the draft tube that at least partially surrounds the draft tube to provide an air chamber between the draft tube and the manifold, an air feed line passing through the inside wall of the draft tube for supplying the oxygen containing gas into the air chamber, the manifold having at least one air exit port adjacent an upper portion thereof, and each of the deflectors being mounted relative to the draft tube and the manifold with the air supply inlet portion of each of the deflectors in air flow communication with the at least one air exit port of the manifold.

11. The hydraulic turbine of claim 10 wherein each of the deflectors further includes a cover plate mounted within the draft tube in spaced relation with the upstream and downstream plates to provide a water flow channel therebetween.

12. The hydraulic turbine of claim 11 wherein each of the deflectors further comprises a baffle portion extending inwardly relative from the inner wall of the draft tube below the air supply inlet portion and above the elongated air communication port, and a water circulation chamber positioned below the baffle portion and behind the downstream plate wherein the baffle portion deflects water passing through the elongated air communication port into and out from the water circulation chamber.

13. The hydraulic turbine of claim 12 wherein the at least one air exit port of the manifold is positioned below the baffle portion of each of the deflectors.

14. The hydraulic turbine of claim 13 wherein each of the deflectors has an internal air flow passageway extending from the air supply inlet portion to the elongated air communication port between the upstream plate and the baffle portion.

15. The hydraulic turbine of claim 14 wherein the baffle is curved in cross-section with an inside concave like wall facing into the water circulation chamber and an outside convex like wall facing the internal air flow passageway.

16. The hydraulic turbine of claim 15 wherein the upstream plate has a back surface portion and a first elongated lip portion that extends transversely across the upstream plate, and the downstream plate extends from the back surface portion of the upstream plate with the first elongated lip overhanging the downstream plate, and the at least one elongated air communication port has a second elongated lip on the downstream plate.

17. The hydraulic turbine of claim 16 further including a turbine runner mounted above the draft tube and each of the deflectors being mounted relative to the vertically inner wall of the draft tube closely adjacent the turbine runner.

18. A deflector for use in a hydraulic turbine for increasing the oxygen content of water flowing through the hydraulic turbine having a draft tube having a vertically extending inside wall, the deflector adapted to be mounted relative to the vertically extending inside wall of the draft tube, and the deflector comprising:
- an upstream plate and a downstream plate, the upstream plate being positioned to extend downwardly and outwardly relative from the vertically extending inside wall of the draft tube and the downstream plate being positioned to extend downwardly and inwardly from the upstream plate,
- at least one elongated air communication port extending through the downstream plate and adjacent the upstream plate,
- an air supply inlet portion positioned above the elongated air communication port at the inner wall of the draft tube, and the air supply inlet portion permitting an oxygen containing gas to enter the deflector and to flow downwardly through the deflector out the elongated air communication port and into the water flowing past the downstream plate.

19. The deflector of claim 18 wherein the upstream plate has a back surface portion and a first elongated lip portion that extends transversely across the upstream plate, and the downstream plate extends from the back surface portion of the upstream plate with the first elongated lip overhanging the downstream plate, and the at least one elongated air communication port has a second elongated lip on the downstream plate.

20. The deflector of claim 19 wherein the first elongated lip is rounded on a first end surface portion thereof facing into the elongated air communication port and the second elongated lip is rounded on a second end surface portion thereof facing out of the elongated air communication port.

21. The deflector of claim 18 further including a cover plate mounted within the draft tube in spaced relation with the upstream and downstream plates to provide a water flow channel therebetween.

22. The deflector of claim 18 wherein the deflector further comprises a baffle portion extending inwardly relative from the inner wall of the draft tube below the air supply inlet portion and above the elongated air communication port, and a water circulation chamber positioned below the baffle portion and behind the downstream plate wherein the baffle portion deflects water passing through the elongated air communication port into and out from the water circulation chamber.

23. The deflector of claim 22 further including an internal air flow passageway extending from the air supply inlet portion to the elongated air communication port between the upstream plate and the baffle portion.

24. The deflector of claim 23 wherein the baffle is curved in cross-section with an inside concave like wall facing into the water circulation chamber and an outside convex like wall facing the internal air flow passageway.

25. The deflector of claim 22 further including a cover plate mounted within the draft tube in spaced relation with the upstream and downstream plates to provide a water flow channel therebetween.

26. The deflector of claim 25 wherein the upstream plate has a back surface portion and a first elongated lip portion that extends transversely across the upstream plate, and the downstream plate extends from the back surface portion of the upstream plate with the first elongated lip overhanging the downstream plate, and the at least one elongated air communication port has a second elongated lip on the downstream plate.

* * * * *